(12) United States Patent
Satish et al.

(10) Patent No.: US 9,672,165 B1
(45) Date of Patent: Jun. 6, 2017

(54) DATA MANAGEMENT TIER COUPLING PRIMARY STORAGE AND SECONDARY STORAGE

(71) Applicant: Symantec Corporation, Mountian View, CA (US)

(72) Inventors: Venkeepuram Satish, Mountain View, CA (US); Niranjan Pendharkar, Mountain View, CA (US)

(73) Assignee: Veritas Technologies LLC, Mountain View, CA (US)

( * ) Notice: Subject to any disclaimer, the term of this patent is extended or adjusted under 35 U.S.C. 154(b) by 0 days.

(21) Appl. No.: 14/284,070

(22) Filed: May 21, 2014

(51) Int. Cl.
| | |
|---|---|
| *G06F 13/10* | (2006.01) |
| *G06F 17/30* | (2006.01) |
| *G06F 11/07* | (2006.01) |
| *G06F 3/06* | (2006.01) |
| *G06F 11/14* | (2006.01) |

(52) U.S. Cl.
CPC .............. *G06F 13/10* (2013.01); *G06F 3/067* (2013.01); *G06F 11/0709* (2013.01); *G06F 11/1464* (2013.01); *G06F 11/1469* (2013.01); *G06F 17/30* (2013.01); *G06F 17/30575* (2013.01)

(58) Field of Classification Search
None
See application file for complete search history.

(56) References Cited

U.S. PATENT DOCUMENTS

| | | | | |
|---|---|---|---|---|
| 5,574,906 A | * | 11/1996 | Morris ................ | G06F 11/1451 707/640 |
| 5,765,173 A | * | 6/1998 | Cane ................... | G06F 11/1453 707/640 |
| 5,781,908 A | * | 7/1998 | Williams et al. ............. | 709/223 |
| 5,799,323 A | * | 8/1998 | Mosher, Jr. ......... | G06F 11/1458 |
| 7,246,140 B2 | * | 7/2007 | Therrien ............. | G06F 11/1448 |
| 7,596,713 B2 | * | 9/2009 | Mani-Meitav et al. ..... | 714/6.32 |
| 7,831,682 B2 | * | 11/2010 | Certain ............... | G06F 11/1451 707/639 |
| 7,987,383 B1 | * | 7/2011 | Coatney et al. ............. | 714/4.11 |
| 8,019,732 B2 | * | 9/2011 | Paterson-Jones . | G06F 17/30067 707/655 |
| 8,386,532 B2 | * | 2/2013 | Annapragada ................ | 707/802 |
| 8,478,790 B2 | * | 7/2013 | Annapragada ................ | 707/802 |
| 8,527,990 B1 | * | 9/2013 | Marathe et al. .................. | 718/1 |

(Continued)

OTHER PUBLICATIONS

'Demystifying Storage Networking' by David Sacks, IBM Storage Networking, Jun. 2001.*

(Continued)

*Primary Examiner* — Steven Snyder
(74) *Attorney, Agent, or Firm* — Womble Carlyle Sandridge & Rice LLP

(57) ABSTRACT

A method of storing data in a storage system is provided. The method includes writing data, from a virtual machine in a compute node, to a primary storage coupled to the virtual machine and sending a first copy of the data from the compute node to a data node. The method includes writing the first copy of the data from the compute node to an intermediate storage coupled as direct attached storage to the data node, and writing a second copy of data from the intermediate storage to a secondary storage, wherein at least one method operation is performed by a processor. A storage system is also provided.

26 Claims, 5 Drawing Sheets

(56) References Cited

U.S. PATENT DOCUMENTS

| | | | | |
|---|---|---|---|---|
| 8,725,967 | B2* | 5/2014 | DeSantis | G06F 11/1464 711/161 |
| 8,863,124 | B1* | 10/2014 | Aron | 718/1 |
| 8,943,103 | B2* | 1/2015 | Annapragada | 707/802 |
| 9,239,689 | B2* | 1/2016 | Baron | G06F 3/0647 |
| 9,286,261 | B1* | 3/2016 | Tzelnic | G06F 15/167 |
| 9,417,968 | B2* | 8/2016 | Dornemann | G06F 11/1446 |
| 9,471,441 | B1* | 10/2016 | Lyadvinsky | G06F 11/1464 |
| 2004/0236800 | A1* | 11/2004 | Elkady | H04L 12/24 |
| 2005/0021821 | A1* | 1/2005 | Turnbull et al. | 709/232 |
| 2005/0027892 | A1* | 2/2005 | McCabe et al. | 709/253 |
| 2006/0101384 | A1* | 5/2006 | Sim-Tang et al. | 717/104 |
| 2006/0117212 | A1* | 6/2006 | Meyer et al. | 714/4 |
| 2007/0088768 | A1* | 4/2007 | Passerini | G06F 3/0607 |
| 2007/0220320 | A1* | 9/2007 | Sen | G06F 11/1456 714/13 |
| 2008/0082592 | A1* | 4/2008 | Ahal | G06F 11/2066 |
| 2009/0006808 | A1* | 1/2009 | Blumrich et al. | 712/12 |
| 2009/0240664 | A1* | 9/2009 | Dinker et al. | 707/3 |
| 2009/0271412 | A1* | 10/2009 | Lacapra | G06F 17/30206 |
| 2011/0197041 | A1* | 8/2011 | Yamada | G06F 11/2064 711/162 |
| 2011/0208933 | A1* | 8/2011 | Selfin | G06F 11/108 711/162 |
| 2012/0011106 | A1* | 1/2012 | Reid et al. | 707/695 |
| 2012/0017037 | A1* | 1/2012 | Riddle et al. | 711/103 |
| 2012/0066677 | A1* | 3/2012 | Tang | 718/1 |
| 2012/0072685 | A1* | 3/2012 | Otani | G06F 11/1451 711/162 |
| 2012/0173919 | A1* | 7/2012 | Patel et al. | 714/4.11 |
| 2012/0246194 | A1* | 9/2012 | Annapragada | 707/770 |
| 2012/0284690 | A1* | 11/2012 | Blakeley et al. | 717/120 |
| 2013/0006943 | A1* | 1/2013 | Chavda | G06F 11/1448 707/652 |
| 2013/0024722 | A1* | 1/2013 | Kotagiri | G06F 11/1004 714/6.1 |
| 2013/0036091 | A1* | 2/2013 | Provenzano | G06F 17/30162 707/624 |
| 2013/0042139 | A1* | 2/2013 | Bhalerao et al. | 714/2 |
| 2013/0326136 | A1* | 12/2013 | Carter | G06F 3/0604 711/111 |
| 2014/0040205 | A1* | 2/2014 | Cometto et al. | 707/639 |
| 2014/0047058 | A1* | 2/2014 | Trachy | G06F 3/0605 709/212 |
| 2014/0075327 | A1* | 3/2014 | Noel et al. | 715/744 |
| 2014/0149357 | A1* | 5/2014 | Gupta | 707/652 |
| 2014/0244950 | A1* | 8/2014 | Baron | G06F 3/065 711/162 |
| 2014/0297979 | A1* | 10/2014 | Baron | G06F 3/0647 711/162 |
| 2014/0344216 | A1* | 11/2014 | Abercrombie | G06F 17/30575 707/609 |
| 2015/0095597 | A1* | 4/2015 | Ayanam | G06F 3/065 711/162 |
| 2015/0293699 | A1* | 10/2015 | Bromley | G06F 3/0641 711/161 |
| 2016/0048450 | A1* | 2/2016 | Ostrowski | G06F 3/0611 714/6.3 |
| 2016/0085574 | A1* | 3/2016 | Dornemann | G06F 11/1458 718/1 |
| 2016/0085636 | A1* | 3/2016 | Dornemann | G06F 11/1469 707/679 |
| 2016/0124680 | A1* | 5/2016 | Baron | G06F 3/0631 711/162 |

OTHER PUBLICATIONS

'DBMS Data Backup' from tutorialspoint, archived from Mar. 28, 2014.*

'Extreme Binning: Scalable, Parallel Deduplication for Chunk-based File Backup' by Deepavali Bhagwat et al., Copyright IEEE MASCOTS, 2009.*

'Write-through, write-around, write-back: Cache explained' by Chris Evans, published Apr. 2014.*

'How Caching Works' by Guy Provost, archive from Jan. 17, 2006.*

* cited by examiner

DATA MANAGEMENT TIER COUPLING PRIMARY STORAGE AND SECONDARY STORAGE

BACKGROUND

Primary storage is directly accessible by the processor (central processing unit or CPU) in the physical computing device or virtual machine to which the primary storage is coupled, while secondary storage or auxiliary storage is not directly accessible by that processor. Secondary storage can be used to backup the primary storage. Software defined storage (SDS), and the software defined data center (SDDC) decouple software from the underlying storage and storage networking hardware. Yet, there are trade-offs in the various systems and solutions presently available. Direct attached storage (DAS) may have high-performance but places requirements on the software and hardware interaction, and may be difficult to scale. Direct attached storage does not generally support off-hosting, e.g., of backup operations and virus scans, etc., because the processor to which the direct attached storage is coupled, is directly involved with the virus scanning and backup operations. In addition, direct attached storage requires a backup window, as there is no application isolation. Direct attached storage often suffers from over provisioning of CPU, memory and network resources and may require a relatively large amount of copies of data in both primary storage, in order to support high availability, and secondary storage, to support disaster recovery. Network attached storage (NAS) and storage area networks (SANs) may offer scalability as shared storage, but have longer delays and slower latency than direct attached storage as a result of the bottleneck phenomenon. Business continuity needs may require specified backup windows, while the ongoing data explosion requires continuous backup and a data access model compatible with continuous backup. Performance needs require a shared nothing direct attached storage, while agility and simplicity require virtualization and public or private clouds for storage. All of these requirements are difficult to satisfy with current systems as the requirements are not able to be accommodated within current storage architectures.

It is within this context that the embodiments arise.

SUMMARY

In some embodiments, a method of storing data in a storage system is provided. The method includes writing data, from a virtual machine in a compute node, to a primary storage coupled to the virtual machine and sending a first copy of the data from the compute node to a data node. The method includes writing the first copy of the data from the compute node to an intermediate storage coupled as direct attached storage to the data node, and writing a second copy of data from the intermediate storage to a secondary storage, wherein at least one method operation is performed by a processor.

In some embodiments, a method of operating a storage system having primary and secondary storage is provided. The method includes writing data to a writeback log coupled to a compute node, the compute node having a virtual machine, and copying data from the writeback log to a primary storage coupled as direct attached storage to the compute node. The method includes copying data from the writeback log to a data node, the data node storing the data copied from the writeback log in an intermediate storage coupled as direct attached storage to the data node. The intermediate storage is distinct from a secondary storage employed to backup data from the intermediate storage, and at least one method operation is performed by a processor.

In some embodiments, a storage system is provided. The storage system includes a compute node, having a temporary storage and a primary storage that are both local to the compute node. The compute node is configured to implement a virtual machine. The system includes a data node, having an intermediate storage local to the data node. The data node is configured to couple to a secondary storage. The compute node is configured to write data to the temporary storage, copy data from the temporary storage to the primary storage, and copy data from the temporary storage to the data node. The data node is configured to write the data copied from the temporary storage to the intermediate storage. The data node is configured to copy data from the intermediate storage to the secondary storage, in a backup operation.

In some embodiments, a storage system is provided. The storage system includes a compute node, configured to implement a virtual machine, and a writeback log coupled to the compute node. The system includes a primary storage as direct attached storage to the compute node and a data node, implemented on a computing device. The system includes an intermediate storage as direct attached storage to the data node, where the data node is configured to couple to a secondary storage. The compute node is configured to write data to the writeback log and the primary storage, and to send a copy of data from the writeback log to the data node. The data node is configured to write the copy of data to the intermediate storage and the data node is configured to write the copy of data from the intermediate storage to the secondary storage.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may be best understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A storage system having a data management tier, with intermediate storage that couples a primary storage and a secondary storage in various embodiments is disclosed. The primary storage and a temporary storage service a compute node, which performs various computing functions and can implement a virtual machine, in some embodiments. The secondary storage is used for backups. One or more data nodes occupy the data management tier, which sits between the primary storage and the secondary storage. The data node, which has the intermediate storage as a direct attached storage, decouples the compute node and primary storage from backup duties. These backup duties are performed by the data node, which copies data to the secondary storage, thus freeing up the compute node and primary storage from direct involvement with the backup operations. Dedicated high-speed networks couple the compute nodes to each other, data nodes to each other, and compute nodes to data nodes, along with further connections.

Embodiments of the data management tier support off-hosting of various processes such as virus checking and backup operations, and offer a hybrid approach combining the performance of direct attached storage with the manageability of a storage area network. In the embodiments, the use of local storage provides high-performance, while the use of centralized storage provides ease of data management. Together, embodiments of the presently disclosed types of storage system, software defined storage and software defined data center provide an enterprise ready hyper-converged virtual environment.

Figure 1:
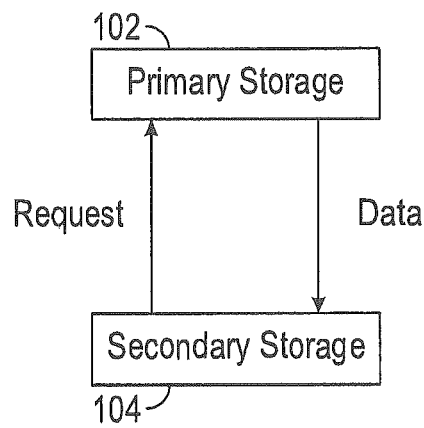
FIG. 1 is a block diagram showing the relationship between primary storage and secondary storage.

FIG. 1 is a block diagram showing the relationship between primary storage 102 and secondary storage 104. In the standard system represented in FIG. 1, a backup operation copies data from the primary storage 102 to the secondary storage 104, usually during a backup window which can be scheduled or operated on demand. Since the secondary storage 104 has longer latency and more delays than the primary storage 102, the backup process, once initiated, proceeds on the basis of a request from the secondary storage 104 to the primary storage 102, requesting data, followed by the primary storage 102 sending the data to the secondary storage 104 in response to the request. The backup process is thus disruptive to the primary storage 102, and especially disruptive to the processor to which the primary storage 102 is coupled. The disruption introduces nondeterministic delays that can disturb other processes in a physical machine or a virtual machine.

Figure 2A:
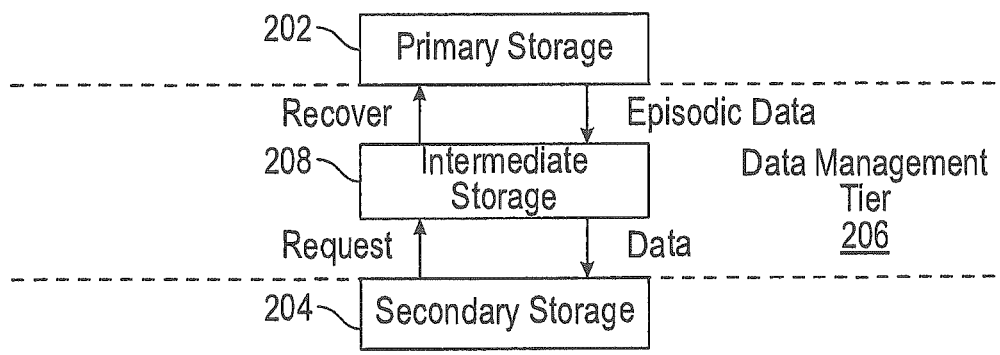
FIG. 2A is a block diagram showing a data management tier, with intermediate storage, coupling the primary storage and the secondary storage, in accordance with same embodiments.

FIG. 2A is a block diagram showing a data management tier 206, with intermediate storage 208, coupling the primary storage 202 and the secondary storage 204, in accordance with an embodiment of the present disclosure. Adding the data management tier 206 changes the relationship of the primary storage 202 to the secondary storage 204, particularly regarding data writes, backup and data recovery. With the embodiment of FIG. 2A, the primary storage 202 sends episodic data to the data management tier 206, which the data management tier 206 stores in intermediate storage 208 that is local to the data management tier 206. This episodic data can be sent at rapid intervals from the primary storage 202 to the data management tier 206, so that the episodic data approaches a continuous backup. Episodic data refers to data that is sent at regular intervals in some embodiments. Data can be recovered from the data management tier 206 to the primary storage 202. It should be appreciated that data recovery refers to reading data from the intermediate storage, as recovered data and writing the recovered data from the intermediate storage 208 to the primary storage 202 in some embodiments. This data recovery can be quite rapid, since the data management tier 206 is coupled closely to the primary storage 202, i.e., more closely than would a secondary storage 204, and has correspondingly lower delays and latency. Meanwhile, the data management tier 206 can send data to the secondary storage 204 for backup, using the request from the secondary storage 204 to the data management tier 206 in a manner similar to how the secondary storage 204 sends a request to the primary storage 102 and receives data from the primary storage 202, as mentioned in FIG. 1. Transfer of data from the data management tier 206 to the secondary storage 204 can occur on a less frequent basis than the episodic data transfers from the primary storage 202 to the data management tier 206. The latencies and disruption that the secondary storage inflicted on the primary storage in FIG. 1 are expressed onto and handled by the data management tier 206 in FIG. 2A, and are isolated from the primary storage 202. In this manner, the backup process is off-hosted relative to the primary storage 202, so that processes in the primary storage 202 can proceed independent of the backup process occurring from the data management tier 206 to the secondary storage 204. Similarly, data analytics (including, but not limited to a virus scan), long-distance data replication for disaster recovery purposes, data warehousing operations and/or further data processing or data movement can proceed out of the data management tier 206 and/or out of the secondary storage 204. Thus, the primary storage 202 is absolved of such responsibilities and attendant delays and disruption. With the separation and isolation, the primary storage 202 is responsible for support of the application(s) involving the primary storage 202, and is not responsible for any of the off-host operations.

Figure 2B:
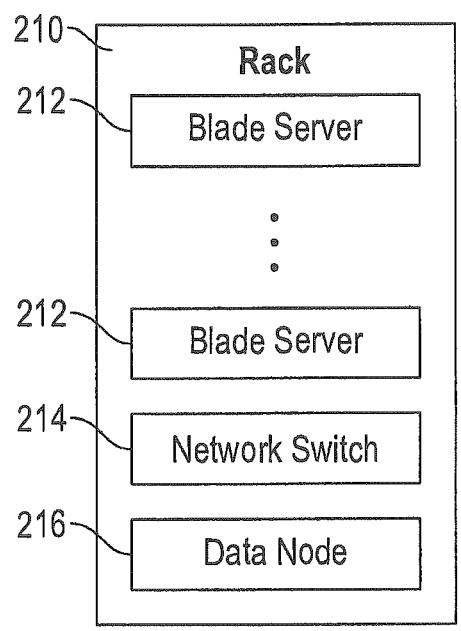
FIG. 2B is a schematic diagram illustrating placement of blade servers, a network switch and a data node in a rack in accordance with same embodiments.

FIG. 2B is a schematic diagram illustrating placement of blade servers 212, a network switch 214 and a data node 216 in a rack 210. These components can implement an embodiment of the system described herein. For example, each blade server 212 could have one or more processors and local storage, such as direct attached storage, that can implement the primary storage 202 of FIG. 2A. In some embodiments, the blade servers 212 have hypervisors and can implement virtual machines. The data node 216 could have similar hardware as a blade server 212, including one or more processors and local storage, such as direct attached storage, that can implement the data management tier 206 and the intermediate storage 208 of FIG. 2A. In some embodiments, the data node 216 has a large amount of hard drives for implementing the intermediate storage 208 of FIG. 2A. In some embodiments, the blade servers 212 have hard drives, and/or flash memory for implementing the primary storage 202 of FIG. 2A. Flash memory provides high-performance although at higher cost, presently, than hard drives. The network switch 214 can implement one or more networks coupling the blade servers 212 and the data node 216. It should be appreciated that the terms local storage and direct attached storage are relative to the one or more processors to which the local storage or the direct attached storage is coupled, and that a storage that is local to one processor and thus considered primary storage to that processor, could be secondary storage to another processor which, in turn, could have its own local storage or primary storage.

Figure 3:
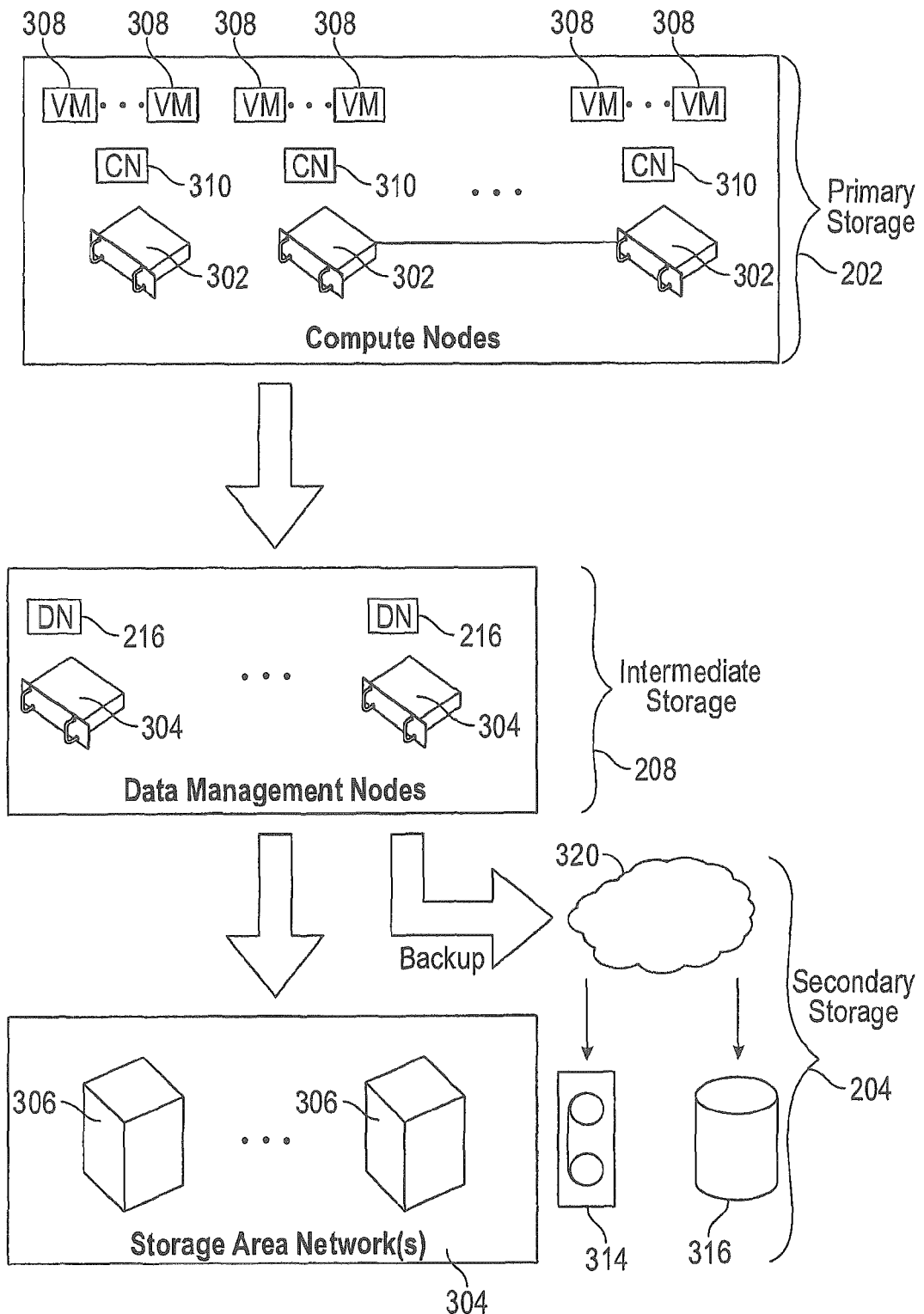
FIG. 3 is a system hardware and data flaw diagram, showing data movement from primary storage to intermediate storage, and from intermediate storage to secondary storage in accordance with same embodiments.

FIG. 3 is a system hardware and data flow diagram, showing data movement from primary storage 202 to intermediate storage 208, and from intermediate storage 208 to secondary storage 204. Compute nodes 302 implement virtual machines 308, and have primary storage 202. The compute nodes 302 are coupled together, for example by a network, in what is considered a primary converged fabric. In the embodiment shown, the compute nodes 302 also implement control nodes 310. For example, one or more virtual machines 308, and a control node 310 could be implemented in a rack-mounted computing device such as the blade server 212 of FIG. 2B. In addition, several such rack-mounted computing devices could be coupled together, for example, by the network switch 214 of FIG. 2B.

Continuing with FIG. 3, data management nodes 304 implement data nodes 216 and have intermediate storage 208. The data management nodes 304 are coupled together, for example by a network, in what is considered a data management and control fabric in some embodiments. In some embodiments, the data management and control fabric has low-cost storage included in the intermediate storage 208. Data, for example the episodic data depicted in FIG. 2A, can flow from the compute nodes 302, in the primary converged fabric, to the data management nodes 304, in the data management and control fabric, for example by a network coupling the fabrics, i.e., coupling the components thereof. In one embodiment, the episodic data is sent every 15 minutes, although other intervals could be applied, as could request or demand-based mechanisms, in further embodiments as the 15 minute interval is just one example.

Secondary storage 204 is shown in FIG. 3 as having multiple possibilities. In various combinations, secondary storage 204 could include one or more storage area networks 306, which could be coupled to the data management nodes 304 by a network. Secondary storage 204 could also include one or more tape drives 314, which could be coupled to the data management nodes 304 by a network cloud 320, for example the global communication network known as the Internet. Secondary storage 204 could further include one or more storage units 316, which could include hard drives or other types of storage, and which could be coupled to the data management nodes 304 by the network cloud 320. Various further types of storage and couplings known to provide secondary storage may also be applicable for the secondary storage 204. Data can flow from the data management nodes 304, in the data management and control fabric, to one or more of the devices in the secondary storage 204 by a network coupling the secondary storage 204 to the data management nodes 304. For example, a backup operation can move data from the data management nodes 304 to the secondary storage 204.

Figure 4A:
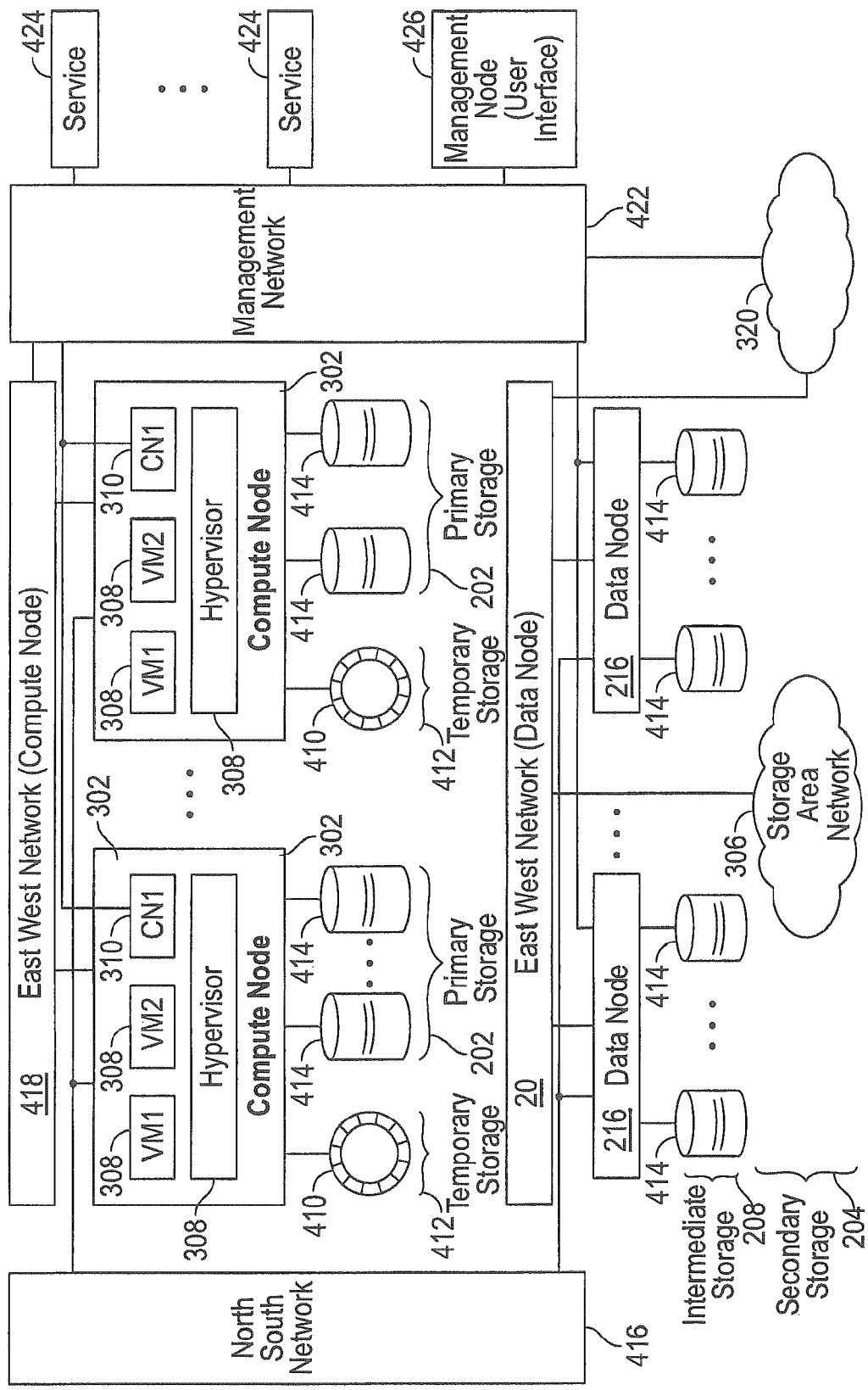
FIG. 4A is a black diagram, showing details of an embodiment of a storage system based an the components of FIGS. 2A-3 in accordance with some embodiments.

FIG. 4A is a block diagram, showing details of an embodiment of a storage system based on the components of FIGS. 2A-3. FIG. 4A can also be considered to show aspects of a software defined storage or a software defined data center. Compute nodes 302, with primary storage 202, are coupled by an East-West network (compute node) 418. Data nodes 216, with intermediate storage 208, are coupled by an East-West network (data node) 420. The East-West network (data node) 420 also couples to a storage area network 306, and/or the global communication network known as the Internet, depicted as the cloud 320, in various embodiments. The compute nodes 302 are coupled to the data nodes 216 by a North-South network 416. A management network 422 couples the control nodes 310 of the compute nodes 302 to the data nodes 216, and also couples to the East-West network (compute node) 418, which allows communication with the virtual machines 308 and the hypervisor 408. Physically, the management network 422 is coupled to all of the blades of the compute nodes 302 and the data nodes 216. The management network 422 further couples to one or more services 424 and to a management node 426, which includes a user interface. In some embodiments, the management network 422, the management node 426 and/or one or more of the services 424 handle load-balancing among the virtual machines 308, and/or decisions of which data node 216 to send data to. The management network 422 may also couple to a global communication network such as the Internet, depicted as the cloud 320, through which cloud services including cloud memory are available. In variations, some or all of these networks 416, 418, 420, 422 are coupled to each other or are combined as a network. In further variations, some of these networks 416, 418, 420, 422 are implemented as busses or other types of couplings. In various embodiments, the East-West network (compute node) 418 is a one gigabyte per second (GBps) or 10 gigabyte per second low latency network, the North-South network 416 is a forty gigabyte per second high bandwidth or high throughput network, and/or the East-West network (data node) 420 is a forty gigabyte per second high bandwidth or high throughput network. In some embodiments, these networks are implemented in the network switch 214 (see FIG. 2B). Embodiments with other specifications of networks or couplings are readily devised in accordance with the teachings disclosed herein.

Each compute node 302 has a hypervisor 408, which manages the virtual machines 308 that can be configured in the compute node 302. Each compute node 302 has a control node 310, which provisions the virtual machines 308 in the compute node 302. The primary storage 202 of the compute node 302 includes direct attached storage 414, such as hard drives and/or flash memory, i.e., the hard drives and/or flash memory are direct attached storage to the compute node 302. The control node 310, which can be implemented as a virtual machine, acts as a storage virtualizer in some embodiments. Particularly, the control node 310 can configure virtual disks, for the virtual machines 308, in the direct attached storage 414 serving as primary storage 202 for the compute node 302. The control node 310 takes custody of the primary storage 202 and allocates resources thereof for the virtual machines 308. As an example, the control node 310 can configure a virtual disk as a file seen in a filesystem, so that a virtual machine 308 writing to a virtual disk is writing to a file. Also as a memory resource for the virtual machines 308 and the compute node 302, a temporary storage 412 is coupled to the compute node 302. A write to a virtual disk is staged onto the temporary storage 412, then to the primary storage 202, and then to the data node 216.

In some embodiments, the temporary storage 412 is implemented as a circular data structure 410, which could be a circular file, a circular buffer, or a circular cache. In further embodiments, the temporary storage 412 is implemented as a file, a buffer, a cache, a first-in first-out (FIFO) stack, a memory or other data structure. The temporary storage 412 serves as, and is operated as, a writeback log. Writeback is a term that can be applied to a cache, in which the cache is written to initially, and a write to a memory backing the cache is performed later. The writeback log, i.e., the temporary storage 412, is written to with any changes intended for the primary storage 202, and these changes are later transferred to the primary storage 202. The temporary storage 412 could be implemented in flash, for high performance, in some embodiments.

Figure 4B:
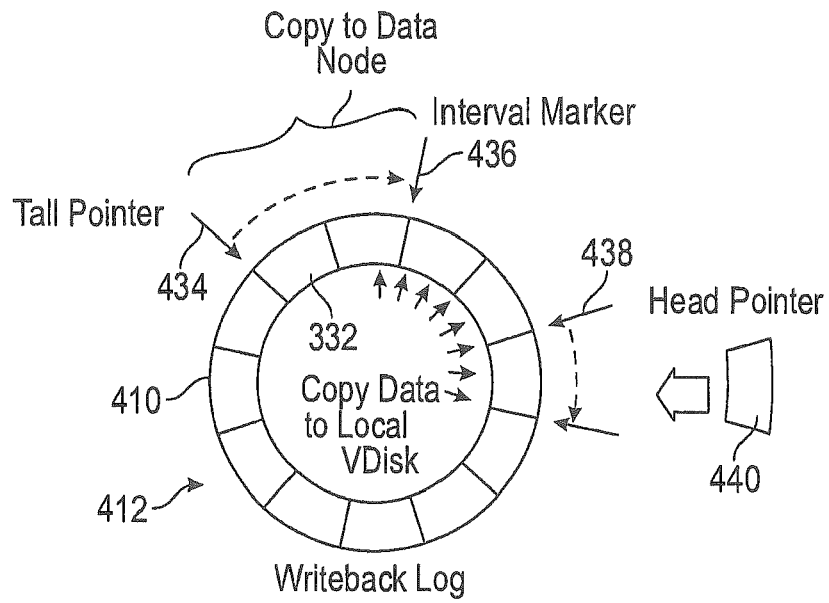
FIG. 4B is a data diagram of a writeback lag, which is suitable far use as the temporary storage in the storage system of FIG. 3A in accordance with same embodiments.

Each data node 216 has intermediate storage 208, which is a storage local to the data node 216. In some embodiments, the intermediate storage 208 is implemented as direct attached storage to the data node 216, and could include hard drives and/or flash memory. Operation of the system shown in FIG. 4A is further described below, followed by a description of operation of an embodiment of the temporary storage 412 as shown in FIG. 4B.

As an example of how a storage system, a software defined storage, or a software defined data center based on the storage system depicted in FIG. 4A operates, consider a data write as initiated by one of the virtual machines 308 of a compute node 302. This data write could occur when the virtual machine 308 is creating or writing to a file, or when the virtual machine 308 receives a file from a network to be written to storage. When the write arrives, e.g., when the virtual machine 308 initiates the write, the data is written to the writeback log, i.e., to the temporary storage 412. In parallel, the write is reflected on another compute node 302. In some embodiments, this is done as a synchronous write, i.e., the write occurs on both compute nodes 302 synchronously. The East-West network (compute node) 418 is a low latency network in some embodiments, and can be employed for this write. One purpose of this synchronous copy or reflection is to mirror the data, so that two copies of the data exist on different compute nodes 302, protecting the system against failure on one compute node 302. This is a form of redundancy, which allows for a degree of fault tolerance. At the other compute node 302, the data is written to a similar writeback log or temporary storage 412 belonging to that compute node 302. In a further embodiment, the copy of the data (i.e., the reflection data) is written to a copy of a virtual disk on a reflection node. Each of the compute nodes 302 acknowledges the write to the corresponding writeback log or temporary storage 412.

Periodically, data is copied from the writeback log or temporary storage 412 to a local virtual disk (also called a Vdisk). This virtual disk is implemented in the primary storage 412 of the compute node 302. It should be appreciated that each compute node 302 implements one or more virtual disks in the primary storage 414 coupled to that compute node 302, and that each compute node 302 copies data from the temporary storage 412 to one of the local virtual disks of that compute node 302. The periodicity for such action could be regular, or variable, or could be based on a schedule or on demand, e.g., based on activity of the temporary storage 412, one or more of the virtual machines 308, the control node 310, or the hypervisor 408. For example, the periodicity could be based on a fixed or variable time span of less than a second, a few seconds, a portion of a minute, or several minutes, or could be interrupt driven, demand driven or poll driven.

Periodically, data is copied from the writeback log or temporary storage 412 to the data node 216. This can be accomplished using the North-South network 416, which is a high-bandwidth network in some embodiments (in order to handle a large amount of data at frequent intervals). The copies from the writeback log to the data node 216 are made less frequently, i.e., at a less frequent interval or after a longer time span than the data copies from the writeback log to the local virtual disk. For example, data could be copied from the writeback log to the data node 216 every minute, every few minutes, every fifteen minutes, every hour, or over another fixed or variable interval, or could be interrupt driven, demand driven or poll driven. Data could be copied based on a predefined interval, or based on activity of the temporary storage 412, one or more of the virtual machines 308, the control node 310, or the hypervisor 408. The data node 216 acknowledges receipt of the data and/or acknowledges completion of the write of the data to the direct attached storage 414 coupled to the data node 216, i.e., the intermediate storage 208. In some embodiments, the data nodes 216 communicate and coordinate as to which part of memory in the direct attached storage 414 the data is written. For example, in some embodiments, data is copied from one data node 216 to another data node 216, via the East-West network (data node) 420, a high throughput network, in order to have redundant copies of data for fault tolerance and data recovery.

Once the data node 216 completes and acknowledges writing the data to the direct attached storage 414 or intermediate storage 208, space is made available from the writeback log and the reflection node. Particularly, the writeback log or temporary storage 412 of each of the compute node 302 and the reflection node (other compute node 302) can reallocate and reuse memory that was used to store the data that has now successfully been sent to the data node 216 and written to the intermediate storage 208. Mechanisms for doing so are further described below with reference to FIG. 4B.

Data can later be copied from intermediate storage 208 to secondary storage 204. For example, a backup operation could be coordinated with the data nodes 216, to copy data from the direct attached storage 414 coupled to each data node 216, to the storage area network 306 coupled to the data nodes 216 by the East-West network (data node) 420. Or, data could be copied from the direct attached storage 414 coupled to each data node 216 to tape drives 314 or storage units 316 (see FIG. 3) via the network cloud 320, e.g. the global communication network, as cloud storage.

As a further example of operation, consider data recovery in the event of a failure. Depending on the nature of the failure, data could be recovered from the writeback log or temporary storage 412, the primary storage 202, or the intermediate storage 208. Data could also be recovered from secondary storage 204, or from reflected data on another compute node 302. The writeback log or temporary storage 412 has the most up-to-date data, but does not have data going back further than the most recent write from the temporary storage 412 to the data node 216, as memory in the writeback log or temporary storage 412 has been freed up since then. A larger amount of recent data can be pieced together from the primary storage 202 and the temporary storage 412. Going back farther than that, data can be restored from the intermediate storage 208. Going back farther than that, data can be restored from the secondary storage 204. If there is a failure in one compute node 302, resources of the reflection node, i.e., the compute node 302 to which the parallel reflection write was made, can be employed. For example, the temporary storage 412 or primary storage 202 of that compute node could be accessed for data recovery.

As still further examples of operations, consider data analytics, data replication and data warehousing, as discussed above with reference to FIG. 2A. In some embodiments, the direct attached storage 414 coupled to each data node 216, i.e., the intermediate storage 208, can be configured as various virtual disks attached to the data node 216. Analytics and data warehousing operations are then performed by making one of the versions of a virtual disk on the data node 216 available for analytics or warehousing applications running elsewhere on a compute node 302.

FIG. 4B is a data diagram of a writeback log, which is suitable for use as the temporary storage 412 in the storage system of FIG. 4A. The writeback log takes the form of a circular data structure 410, tracked by pointers 434, 436, 438. The head pointer 438 points to the head of the circular data structure 410. Newly arriving data 440, such as a data segment, a portion of a file, or an entire file, is written into the circular data structure 410, starting at the address pointed to by the head pointer 438. The head pointer 438 is updated to point to the forward end of the newly arrived data 440, e.g., by overwriting the contents of the head pointer 438 with the address of the forward end of the newly arrived data 440. A tail pointer 434 points to the tail of data 432, i.e., the tail pointer 434 has the address of the beginning of the oldest data 432 that has not yet been copied out of the circular data structure 410. An interval marker 436 is set to indicate data to be copied to the data node 216. Data 432 from the tail pointer 434 to the interval marker 436 is copied to the data node 216, and the tail pointer 434 is updated by writing the address of the interval marker 436 to the tail pointer 434, so that the memory between the tail pointer 434 and the interval marker 436 can be freed up (i.e., reused the next time the head pointer 438 advances thereto). In the example shown, the head pointer 438 has advanced forward of the interval marker 436, since data 440 continues to arrive at the writeback log. In the example shown, data is copied to the local virtual disk (see arrows symbolically pointing to the inner radius of the circular data structure 410) at briefer intervals than specified by the tail pointer 434 and the interval marker 436. This could be tracked by additional pointers analogous to the tail pointer 434 and the interval marker 436. It should be appreciated that the tail pointer 434, the interval marker 436, and further pointers employed for the more frequent copies to the local virtual disk should not advance past the head pointer 438, nor should the head pointer 438 advance past the tail pointer 434, lest data be lost.

Figure 5:
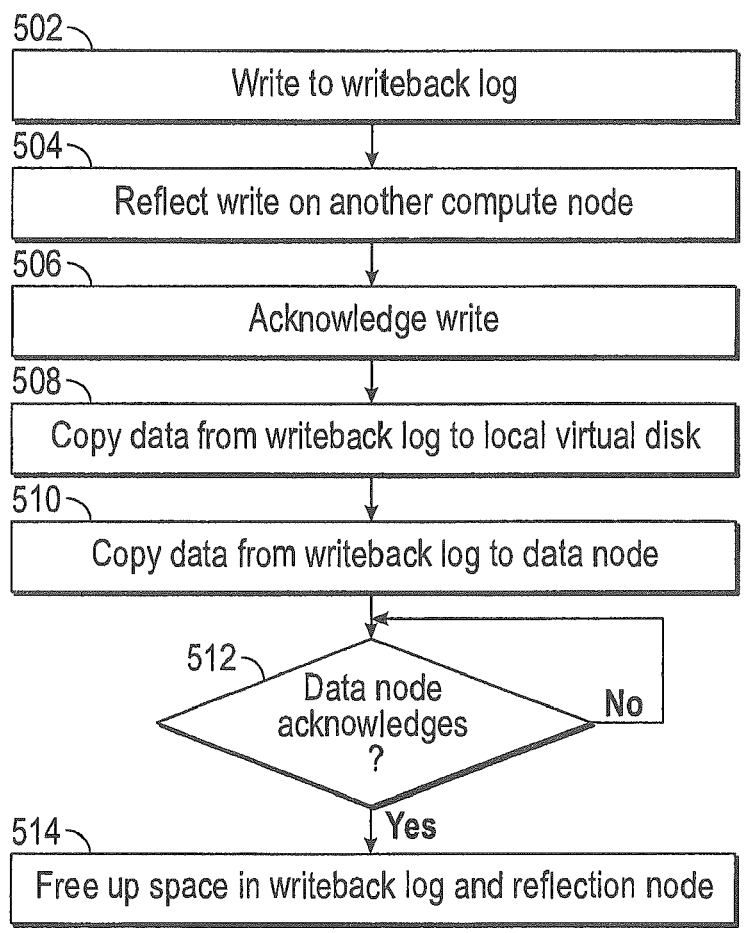
FIG. 5 is a flow diagram of a method for operating a storage system, which can be practiced an embodiments of the storage system depicted in FIGS. 2A-4B and variations thereof in accordance with same embodiments.

FIG. 5 is a flow diagram of a method for operating a storage system, which can be practiced on embodiments of the storage system depicted in FIGS. 2A-4B and variations thereof. A processor, such as one or more processors implementing a compute node and/or a data node, can perform steps of the method. In this version of the method, a staged write is performed.

In an action 502, a write to a writeback log occurs. For example, a virtual machine in a compute node could write to a file, and the compute node could handle this by performing a staged write, starting by writing to a writeback log. In an action 504, the write is reflected on another compute node. For example, a synchronous write could be performed on two compute nodes, one acting as the initial or primary compute node, the other acting as the reflection node.

The write is acknowledged, in an action 506. Such an acknowledgment could be performed in hardware or software. For example, the acknowledgment could be sent as a message form one compute node to another compute node. In an action 508, data is copied from the writeback log to a local virtual disk. For example, the local virtual disk could be configured in direct attached storage by a control node. This copying could be at frequent intervals.

In an action 510, data is copied from the writeback log to a data node. This copying could occur at less frequent intervals than the copies performed in the action 408. The data node could have intermediate storage that is direct attached storage to the data node. In a decision action 512, it is determined if the data node acknowledges that the data copy from the writeback log to the data node is complete. For example, does the data node acknowledge that the data copy from the writeback log to the data node is complete, i.e., that the data is now safely stored in the intermediate storage? If the answer is no, flow cycles back to the decision action 512 until the data node acknowledges the data is now safely stored in the intermediate storage. In various embodiments, this could be a polling action, interrupt driven, or otherwise based on actions of the data node as perceived by the compute node controlling the writeback log. If the answer is yes, flow proceeds to the action 514. In the action 514, space is made available in the writeback log and the reflection node. This could be handled by appropriately adjusting pointers for the writeback log in the compute node and the writeback log in the reflection node. The freed up space can then be later used for more writes to the writeback log, subject to the pointers.

Figure 6:
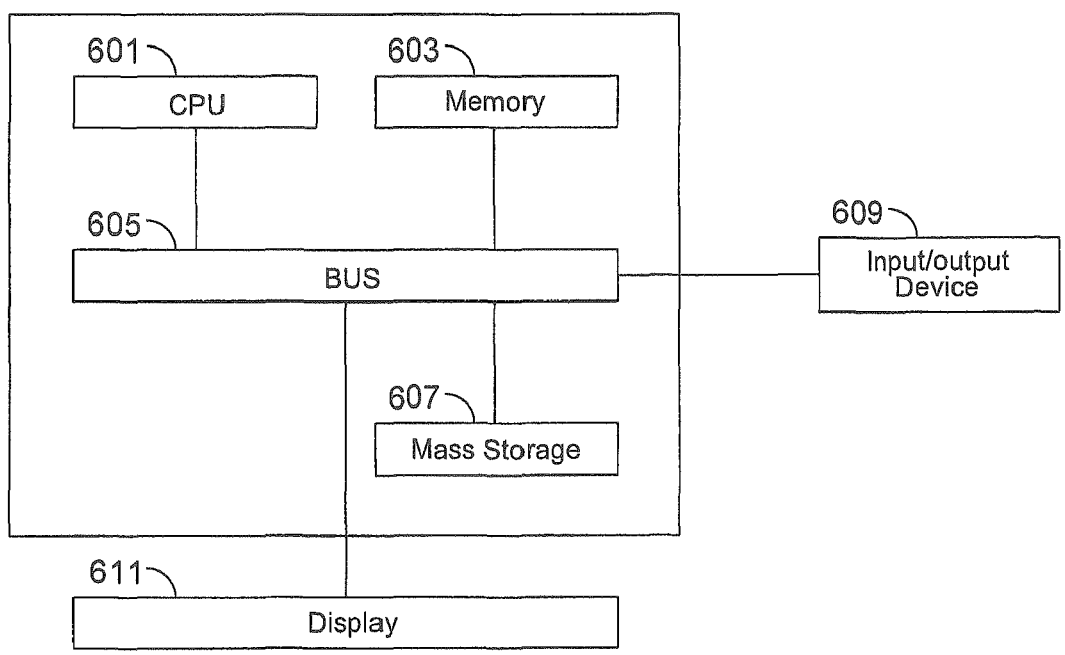
FIG. 6 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 6 is an illustration showing an exemplary computing device which may implement the embodiments described herein. The computing device of FIG. 6 may be used to perform embodiments of the functionality for provisioning and operation of virtual computers, allocation and operation of memory, and communication between nodes, in accordance with some embodiments. The computing device includes a central processing unit (CPU) 601, which is coupled through a bus 605 to a memory 603, and mass storage device 607. Mass storage device 607 represents a persistent data storage device such as a floppy disc drive or a fixed disc drive, which may be local or remote in some embodiments. The mass storage device 607 could implement a backup storage, in some embodiments. Memory 603 may include read only memory, random access memory, etc. Applications resident on the computing device may be stored on or accessed via a computer readable medium such as memory 603 or mass storage device 607 in some embodiments. Applications may also be in the form of modulated electronic signals modulated accessed via a network modem or other network interface of the computing device. It should be appreciated that CPU 601 may be embodied in a general-purpose processor, a special purpose processor, or a specially programmed logic device in some embodiments.

Display 611 is in communication with CPU 601, memory 603, and mass storage device 607, through bus 605. Display 611 is configured to display any visualization tools or reports associated with the system described herein. Input/output device 609 is coupled to bus 605 in order to communicate information in command selections to CPU 601. It should be appreciated that data to and from external devices may be communicated through the input/output device 609. CPU 601 can be defined to execute the functionality described herein to enable the functionality described with reference to FIGS. 2A-5. The code embodying this functionality may be stored within memory 603 or mass storage device 607 for execution by a processor such as CPU 601 in some embodiments. The operating system on the computing device may be MS-WINDOWS™, UNIX™, LINUX™, CentOS™, Android™, Redhat Linux™, z/OS™, EMC ISILON ONEFS™, DATA ONTAP™ or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of storing data in a storage system, comprising:
    writing data, from a virtual machine in a compute node, to a temporary storage in the compute node and coupled to the virtual machine and in parallel with the writing data to the temporary storage, reflecting the write onto another compute node;
    copying data from the temporary storage to a primary storage coupled to the virtual machine;
    reading data from the temporary storage;
    sending the data that is read from the temporary storage in the compute node to a data node;
    writing the data that is read from the temporary storage in the compute node to an intermediate storage coupled as direct attached storage to the data node; and
    writing a second copy of data from the intermediate storage to a secondary storage; and
    reusing space in the temporary storage, responsive to the sending the data from the temporary storage to the data node.

2. The method of claim 1, further comprising:
    reading data from the intermediate storage, as recovered data; and
    writing the recovered data from the intermediate storage to the primary storage.

3. The method of claim 1, further comprising:
    reading data from the secondary storage, as recovered data;
    writing the recovered data to the intermediate storage; and
    writing the recovered data to the compute node.

4. The method of claim 1, further comprising:
    writing data to a temporary storage coupled to the compute node, wherein the writing data to the primary storage includes copying data from the temporary storage to a virtual disk that is local to the virtual machine, the virtual disk configured in the primary storage.

5. The method of claim 1, further comprising:
    writing data to a temporary storage; and
    performing a synchronous write to another compute node, of the data written to the temporary storage.

6. The method of claim 1, further comprising:
    writing data to a temporary storage, wherein sending a copy of the data from the compute node to a data node includes sending a copy of the data from the temporary storage to the data node for storage in the intermediate storage; and
    freeing up space in the temporary storage in response to an acknowledgment from the data node of writing the copy of the data from the temporary storage to the intermediate storage.

7. The method of claim 1, wherein a periodicity of the writing data from the virtual machine to the primary storage is shorter than a periodicity of the sending a copy of the data from the compute node to the data node.

8. A method of operating a storage system having primary and secondary storage, the method comprising:
    writing data to a writeback log coupled to a compute node, the compute node having a virtual machine and in parallel with the writing data to the writeback log, reflecting the write onto another compute node;
    copying data that is read from the writeback log to a primary storage coupled as direct attached storage to the compute node; and
    copying data that is read from the writeback log to a data node, the data node storing the data copied from the writeback log in an intermediate storage coupled as direct attached storage to the data node, wherein the intermediate storage is distinct from a secondary storage employed to backup data from the intermediate storage; and
    reusing space in the writeback log, responsive to copying data from the writeback log to the data node.

9. The method of claim 8, wherein the primary storage includes a configuration as a virtual disk, and copying data from the writeback log to the primary storage includes copying data from the writeback log to the virtual disk.

10. The method of claim 8, wherein: the copying data from the writeback log to the primary storage occurs more often than the copying data from the writeback log to the data node.

11. The method of claim 8, further comprising:
    tracking the writing data to the writeback log, the copying data from the writeback log to the primary storage, and the copying data from the writeback log to the data node, via application of a pointer; and
    reusing space in the writeback log, responsive to a completion of the copying data from the writeback log to the data node.

12. The method of claim 8, further comprising:
    recovering data to the compute node from one of: the writeback log, the intermediate storage, storage on a reflected node, or the secondary storage.

13. A storage system, comprising:
    a compute node, having a temporary storage and a primary storage that are local to the compute node, the compute node configured to implement a virtual machine;
    a data node, having an intermediate storage local to the data node, the data node configured to couple to a secondary storage;
    the compute node configured to: write data to the temporary storage, copy data that is read from the temporary storage to the primary storage, and copy data that is read from the temporary storage to the data node;
    a further compute node, having a further temporary storage;
    the compute node configured to perform a reflect write to the further compute node in parallel with the write data to the temporary storage;
    the compute node configured to reuse space in the temporary storage, responsive to copying data from the temporary storage to the data node;
    the data node configured to write the data that is read from the temporary storage to the intermediate storage; and
    the data node configured to copy data from the intermediate storage to the secondary storage, in a backup operation.

14. The storage system of claim 13, further comprising:
    the temporary storage including one of: a circular file, a circular buffer, or a circular cache.

15. The storage system of claim 13, further comprising:
    a first network, configured to couple the data node and a further data node to the compute node and a further compute node;
    a second network configured to couple a control node of the compute node, a further control node of a further compute node, the data node, and the further data node to a management node;
    a third network configured to couple the compute node and the further compute node; and
    a fourth network configured to couple the data node, the further data node and a network having further storage.

16. The storage system of claim 13, further comprising:
the compute node having a control node configured to provision virtual machines in the compute node; and
the compute node having a hypervisor, configured to manage the virtual machines.

17. The storage system of claim 13, further comprising:
a further compute node;
the compute node configured to perform, as a reflected write, a synchronous write to the further compute node in parallel with the compute node write of the data to the temporary storage.

18. The storage system of claim 13, further comprising:
the compute node configured to free up space in the temporary storage, responsive to completion of the copy data from the temporary storage to the data node and completion of a reflected write.

19. The storage system of claim 13, further comprising:
the compute node configured to recover data from the temporary storage; and
the data node configured to recover data from the intermediate storage to the compute node, and configured to recover data from the secondary storage to the compute node.

20. A storage system, comprising:
a compute node, configured to implement a virtual machine;
a writeback log coupled to the compute node;
a primary storage as direct attached storage to the compute node;
a data node, implemented on a computing device, the data node configured to couple to a secondary storage;
an intermediate storage as direct attached storage to the data node;
the compute node configured to write data to the writeback log and the primary storage, and to send a copy of data that is read from the writeback log to the data node;
a further compute node, having a further writeback log;
the compute node configured to perform a reflect write to the further compute node in parallel with the write data to the writeback log;
the compute node configured to reuse space in the writeback log, responsive to the send a copy of data from the writeback log to the data node and an acknowledgment from the further compute node as to the reflect write;
the data node configured to write the copy of data that is read from the writeback log to the intermediate storage; and
the data node configured to write the copy of data from the intermediate storage to the secondary storage.

21. The storage system of claim 20, further comprising:
the writeback log including a pointer and one of: a circular file, a circular buffer, or a circular cache.

22. The storage system of claim 20, further comprising:
one or more networks configured to couple compute nodes, including the compute node, data nodes, including the data node, further storage, a service, and a management node.

23. The storage system of claim 20, wherein the compute node configured to write data to the writeback log in the primary storage includes the compute node configured to write data to the writeback log and to copy data from the writeback log into a virtual disk configured in the primary storage.

24. The storage system of claim 20, further comprising:
a flash memory coupled to the compute node, wherein the writeback log is implemented in the flash memory.

25. The storage system of claim 20, further comprising:
the data node configured to support off-hosting of one of: virus scan, data analytics, or backup, independent of the compute node.

26. The storage system of claim 20, further comprising:
the intermediate storage configured as a plurality of virtual disks, with at least one of the plurality of virtual disks available for analytics or warehousing applications executing on one of the compute node or a further compute node.

* * * * *